US007778221B2

(12) United States Patent
Lee et al.

(10) Patent No.: US 7,778,221 B2
(45) Date of Patent: Aug. 17, 2010

(54) APPARATUS AND METHOD FOR REQUESTING BANDWIDTH ALLOCATION AND ALLOCATING BANDWIDTH IN A COMMUNICATION SYSTEM

(75) Inventors: Ok-Seon Lee, Suwon-si (KR); Jong-Hyung Kwun, Seongnam-si (KR); Chan-Ho Min, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 225 days.

(21) Appl. No.: 12/214,320

(22) Filed: Jun. 18, 2008

(65) Prior Publication Data

US 2008/0317033 A1    Dec. 25, 2008

(30) Foreign Application Priority Data

Jun. 22, 2007   (KR) .................... 10-2007-0061556

(51) Int. Cl.
*H04W 28/20* (2009.01)
*H04W 72/04* (2009.01)
*H04W 76/02* (2009.01)

(52) U.S. Cl. .................... 370/329; 370/395.2; 370/468

(58) Field of Classification Search .................... None
See application file for complete search history.

(56) References Cited

U.S. PATENT DOCUMENTS

| 7,529,193 | B2* | 5/2009 | Zimmerman et al. | 370/252 |
| 2001/0038620 | A1* | 11/2001 | Stanwood et al. | 370/336 |
| 2002/0080816 | A1* | 6/2002 | Spinar et al. | 370/449 |
| 2002/0196808 | A1* | 12/2002 | Karri et al. | 370/468 |
| 2003/0142692 | A1* | 7/2003 | Shimada | 370/442 |
| 2005/0089064 | A1* | 4/2005 | Zimmerman et al. | 370/468 |
| 2006/0002336 | A1 | 1/2006 | Stanwood et al. | |
| 2006/0146863 | A1 | 7/2006 | Spinar et al. | |
| 2006/0245352 | A1* | 11/2006 | Kang et al. | 370/229 |
| 2007/0104221 | A1* | 5/2007 | Venkatachalam | 370/468 |
| 2007/0133402 | A1* | 6/2007 | Lee et al. | 370/229 |
| 2007/0201399 | A1* | 8/2007 | Lee et al. | 370/329 |
| 2008/0232342 | A1* | 9/2008 | Spinar et al. | 370/346 |

OTHER PUBLICATIONS

International Search Report dated Oct. 28, 2008 in connection with PCT Application No. PCT/KR2008/003223.
"IEEE Standard for Local and metropolitan area networks, Part 16: Air Interface for Fixed and Mobile Broadband Wireless Access Systems, Amendment 2: Physical and Medium Access Control Layers for Combined Fixed and Mobile Operation in Licensed Bands, and Corrigendum 1", Feb. 28, 2006, 864 pages, see p. 36 "6.3.2.2 MAC subheaders and special payloads".

* cited by examiner

*Primary Examiner*—Min Jung (57) ABSTRACT

A method and apparatus for requesting bandwidth allocation and allocating a bandwidth in response to the request in a communication system are provided, in which an mobile station detects a second CID requiring bandwidth allocation, the second CID being different from a first CID included in a MAC header, generates a grant management subheader including an order field and a bandwidth field, the order field being for writing a rank of the second CID in a CID list listing CIDs of the mobile station according to a predetermined criterion and the bandwidth field being for writing a bandwidth required for the second CID, concatenates the grant management subheader to the MAC header, and transmits the concatenated MAC header and grant management subheader to a base station to request bandwidth allocation for the second CID.

22 Claims, 6 Drawing Sheets

APPARATUS AND METHOD FOR REQUESTING BANDWIDTH ALLOCATION AND ALLOCATING BANDWIDTH IN A COMMUNICATION SYSTEM

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Jun. 22, 2007 and assigned Serial No. 2007-61556, the entire disclosure of which is hereby incorporated by reference.

TECHNICAL FIELD OF THE INVENTION

The present invention generally relates to a communication system. More particularly, the present invention relates to an apparatus and method for requesting UpLink (UL) bandwidth allocation and allocating a UL bandwidth in response to the request in a communication system.

BACKGROUND OF THE INVENTION

Due to limited resources available for communication systems, active studies have been conducted on efficient use of the resources. To efficiently use the limited resources, unnecessary resource allocation should be prevented and already-allocated resources should be retrieved early and reallocated for other services.

Meanwhile, a Base Station (BS) should allocate a UL bandwidth rapidly to a Mobile Station (MS) in response to a UL bandwidth allocation request from the MS. UL bandwidth allocation requests are issued on an MS's Connection IDentifier (CID) basis and UL bandwidths are allocated on an MS basis. That is, the MS requests a required bandwidth for each CID and the BS collects information about requested bandwidths for respective CIDs and allocates the bandwidths to respective MSs. The MS can request a UL bandwidth by polling or piggyback. Polling is a scheme in which the MS requests bandwidth allocation by transmitting a 6-byte BandWidth Request (BR) header having information about a UL bandwidth required for each CID of the MS at every predetermined polling interval.

Figure 1:
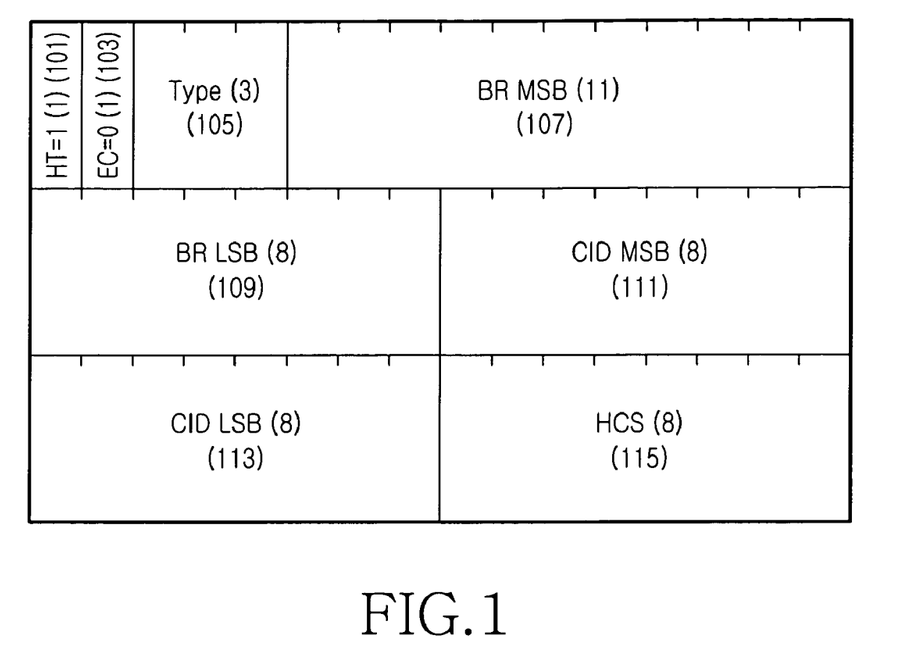
FIG. 1 illustrates the structure of a UL BR header.

FIG. 1 illustrates the structure of a UL BR header. Referring to FIG. 1, the UL BR header includes a Header Type (HT) 101, an EnCoding (EC) 103, a Type 105, a BR 107 and 109, a CID 111 and 113, and a Header Check Sequence (HCS) 115.

Before describing the piggyback scheme, a description will be made of the structure of a generic Media Access Control (MAC) header with reference to FIG. 2.

Figure 2:
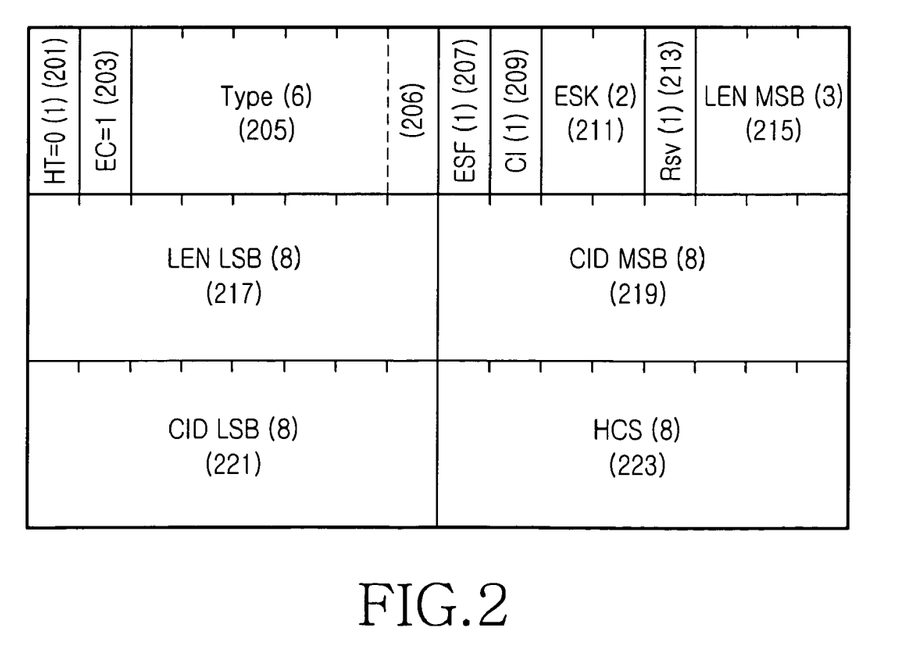
FIG. 2 illustrates the structure of a generic MAC header.

FIG. 2 illustrates the generic MAC header structure. Referring to FIG. 2, the generic MAC header includes an HT 201, an EC 203, a Type 205 and 206, an Extended Subheader Field (ESF) 207 indicating whether a subheader is included, a Cyclic Redundancy Check (CRC) Indicator (CI) 209 indicating the existence or absence of CRC errors, an Encryption Key Sequence (EKS) 211 including information about a key used for payload encryption, a LENgth (LEN) 215 and 217, a CID 219 and 221, and an HCS 223.

In order to request bandwidth allocation according to the piggyback scheme, the MS sets a Least Significant Bit (LSB) 206 of the Type 205 and 206 to '1' and piggybacks the generic MAC header with a grant management subheader having information about a UL bandwidth required for a certain CID. The Type LSB 206 indicates whether the grant management subheader is set, and an excess bandwidth to be added to an already-allocated bandwidth for the CID is written in the grant management subheader. The contents of the grant management subheader vary depending on a service type corresponding to the CID. The grant management subheader has the following format illustrated in Table 1.

TABLE 1

| Syntax | Size (bits) | Notes |
|---|---|---|
| Grant management subheader( ) { | | |
| if (scheduled service type==UGS) { | | |
| SI | 1 | |
| PM | 1 | |
| FU | 1 | |
| FL | 4 | |
| reserved | 9 | Shall be set to zero |
| }elseif (scheduled service type==extended rtPS) { | | |
| Extended Piggyback Request | 11 | |
| FU | 1 | |
| FL | 4 | |
| }else { | | |
| PiggyBack Request | 16 | |
| } | | |

Table 1 illustrates a grant management subheader format for Unsolicited Guaranteed Service (UGS) and extended real time Polling Service (rtPS), by way of example. Depending on a scheduled service type, the grant management subheader varies in contents. Besides UGS and extended rtPS, the grant management subheader can serve such scheduled service types as rtPS, non real time Polling Service (nrtPS), and Best Effort (BE) service.

Fields of the grant management subheader are given in Table 2 below.

TABLE 2

| Name | Length (bits) | Description |
|---|---|---|
| SI | 1 | Slip Indicator<br>0 = No Action<br>1 = Used by the MS to indicate a slip of UL grants relative to the UL queue depth |
| PM | 1 | Poll-Me<br>0 = No Action<br>1 = Used by the MS to request a bandwidth poll |
| FLI | 1 | Frame Latency Indication<br>0 = Frame latency field disabled for this grant<br>1 = Frame latency field enabled for this grant |
| FL | 4 | Frame Latency<br>The number of frames previous to the current one in which the transmitted data was available. When the latency is greater than 15 then the FL field shall be set to 15. |
| Extended PBR | 11 | Extended PiggyBack Request<br>The number of bytes of UL bandwidth requested by the MS. The bandwidth request is for the CID. The request shall not include any PHY overhead. The request shall be incremental. In case of the Extended rtPS, if the MSB is 1, the BS changes its |

TABLE 2-continued

| Name | Length (bits) | Description |
|---|---|---|
| PiggyBack Request | 16 | polling size into the size specified in the LSBs of this field. PiggyBack Request The number of bytes of UL bandwidth requested by the MS |

As described above, to use resources efficiently for data transmission and reception, it is critical that the BS rapidly allocates a UL bandwidth to the MS in response to a UL bandwidth allocation request from the MS.

Due to its fixed polling interval, however, the polling scheme causes a latency when a bandwidth allocation request is generated during a time period between polling intervals. If the MS does not transmit a bandwidth allocation request during a predetermined polling interval, UL resources allocated for transmission of a BR header are wasted.

The piggyback scheme boasts of high utilization and less overhead than the polling scheme since it is feasible whenever UL transmission data exists. Nonetheless, the piggyback scheme also has a shortcoming in that a bandwidth allocation request is confined to a CID included in a generic MAC header (hereinafter, referred to as a generic MAC header CID). Therefore, if the MS corresponding to the generic MAC header CID wants to request bandwidth allocation for another CID that the MS has, it should use a 6-byte BR header, thus increasing overhead.

SUMMARY OF THE INVENTION

To address the above-discussed deficiencies of the prior art, it is a primary aspect of exemplary embodiments of the present invention to address at least the problems and/or disadvantages and to provide at least the advantages described below. Accordingly, an aspect of exemplary embodiments of the present invention is to provide an apparatus and method for requesting UL bandwidth allocation by an MS and allocating a UL bandwidth to the MS in response to the request by a BS in a communication system.

Another aspect of exemplary embodiments of the present invention provides an apparatus and method for requesting bandwidth allocation for a CID other than a generic MAC header CID among CIDs of an MS by use of a piggyback area set for the generic MAC header CID by the MS and allocating a bandwidth to the MS in response to the request by a BS in a communication system.

In accordance with an aspect of exemplary embodiments of the present invention, there is provided a method for requesting bandwidth allocation in an MS in a communication system, in which a second CID that is different from a first CID included in a MAC header requires bandwidth allocation is detected, a grant management subheader including an order field and a bandwidth field is generated, the order field being for writing a rank of the second CID in a CID list listing CIDs of the MS according to a predetermined criterion and the bandwidth field being for writing a bandwidth required for the second CID, the grant management subheader is concatenated to the MAC header, and the concatenated MAC header and grant management subheader is transmitted to a BS to request bandwidth allocation for the second CID.

In accordance with another aspect of exemplary embodiments of the present invention, there is provided a method for requesting bandwidth allocation in a BS in a communication system, in which a MAC header and a grant management subheader including an order field and a bandwidth field are received from an MS, the order field being for writing a rank of a second CID different from a first CID included in the MAC header and requiring bandwidth allocation in a CID list listing CIDs of the MS according to a predetermined criterion and the bandwidth field being for writing a bandwidth required for the second CID, the second CID is detected in the order field, the bandwidth required for the second CID is detected in the bandwidth field, and an available bandwidth is allocated to the MS based on the detected bandwidth.

In accordance with a further aspect of exemplary embodiments of the present invention, there is provided an apparatus for requesting bandwidth allocation in an MS in a communication system, in which a controller detects a second CID that is different from a first CID included in a MAC header and requires bandwidth allocation, and generates a grant management subheader including an order field and a bandwidth field, the order field being for writing a rank of the second CID in a CID list listing CIDs of the MS according to a predetermined criterion and the bandwidth field being for writing a bandwidth required for the second CID, and a transmitter concatenates the grant management subheader to the MAC header and transmits the concatenated MAC header and grant management subheader to a BS to request bandwidth allocation for the second CID.

In accordance with still another aspect of exemplary embodiments of the present invention, there is provided an apparatus for requesting bandwidth allocation in a BS in a communication system, in which a receiver receives from an MS a MAC header and a grant management subheader including an order field and a bandwidth field, the order field being for writing a rank of a second CID different from a first CID included in the MAC header and requiring bandwidth allocation in a CID list listing CIDs of the MS according to a predetermined criterion and the bandwidth field being for writing a bandwidth required for the second CID, and a controller detects the second CID in the order field, detects the bandwidth required for the second CID in the bandwidth field, and allocates an available bandwidth to the MS based on the detected bandwidth.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 3 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Exemplary embodiments of the present invention provide an apparatus and method for requesting UL resources and allocating UL resources in response to the request in a communication system.

The exemplary embodiments of the present invention also provide an apparatus and method for requesting a UL bandwidth on a CID basis according to a condition preset for CIDs, for example, priority, urgency, Quality of Service (QoS), or the like by an MS, and allocating a UL bandwidth to the MS by a BS in response to the request in a communication system.

Before describing a novel method for requesting bandwidth allocation and allocating a bandwidth according to the present invention, a description will first be made of the structure of a generic MAC header in a communication system according to an exemplary embodiment of the present invention.

Figure 3:
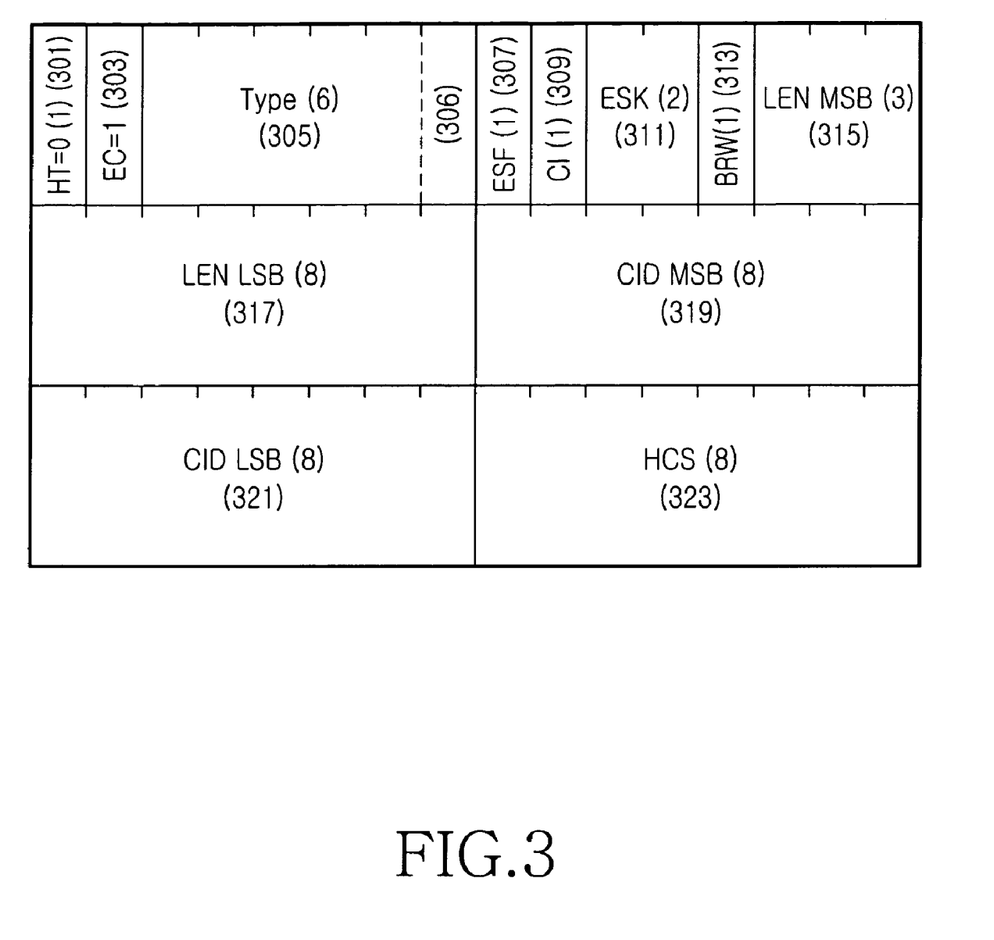
FIG. 3 illustrates the structure of a new generic MAC header proposed according to the present invention.

FIG. 3 illustrates the structure of the new generic MAC header proposed according to the present invention.

Referring to FIG. 3, the proposed generic MAC header includes an HT 301, an EC 303, a Type 305 and 306, an ESF 307 indicating the presence or absence of a subheader, a CI 309 indicating the presence or absence of CRC errors, an EKS 311 having information about a key used for payload encryption, a BoRroWing (BRW) 313, a LEN 315 and 317, a CID 319 and 321, and an HCS 323.

In accordance with the new bandwidth allocation requesting method according to the present invention, a UL bandwidth is requested by combining the bits of a Type LSB 306 and the BRW 313. The Type LSB 306 is a bit indicating whether a grant management subheader is piggybacked to the generic MAC header. The grant management subheader has the format illustrated in Table 3 below.

TABLE 3

| Syntax | Size (bits) | Notes |
|---|---|---|
| Grant management subheader( ) { | | |
|   if (BWR==0) { | | |
|     if (scheduled service type==UGS) | | |
|     { | | |
|       SI | 1 | |
|       PM | 1 | |
|       FU | 1 | |
|       FL | 4 | |
|       Reserved | 9 | Shall be set to zero |
|     }elseif (scheduled service type==extended rtPS) { | | |
|       Extended Piggyback Request | 11 | |
|       FU | 1 | |
|       FL | 4 | |
|     }else { | | |
|       PiggyBack Request | 16 | |
|     } | | |
|   } else { | | |
|     The order of CID to try PGB | n | |
|     PiggyBack Request | 16 − n | |
|   } | | |
| } | | |

In Table 3, the upper block surrounded by double lines represents the conventional format and the lower block surrounded by double lines, including the fields of The order of CID to try PGB and PiggyBack Request represents a proposed format.

For the grant management subheader, if BRW=0, the conventional format described with reference to Table 1 is used and if BRW=1, the proposed format is used according to the present invention.

While the grant management subheader format illustrated in Table 3 is for UGS and extended rtPS, it is a mere exemplary application. Depending on a scheduled service type, the grant management subheader varies in contents. Besides UGS and extended rtPS, the grant management subheader can serve such scheduled service types as rtPS, nrtPS, and BE service.

Fields of the grant management subheader are given in Table 4 below.

TABLE 4

| Name | Length (bits) | Description |
|---|---|---|
| SI | 1 | Slip Indicator<br>0 = No Action<br>1 = Used by the SS to indicate a slip of UL grants relative to the UL queue depth |
| PM | 1 | Poll-Me<br>0 = No Action<br>1 = Used by the SS to request a bandwidth poll |
| FLI | 1 | Frame Latency Indication<br>0 = Frame latency field disabled for this grant<br>1 = Frame latency field enabled for this grant |
| FL | 4 | Frame Latency<br>The number of frames previous to the current one in which the transmitted data was available. When the latency is greater than |

TABLE 4-continued

| Name | Length (bits) | Description |
|---|---|---|
| | | 15 then the FL field shall be set to 15. |
| Extended PBR | 11 | Extended PiggyBack Request The number of bytes of UL bandwidth requested by the MS. The bandwidth request is for the CID. The request shall not include any PHY overhead. The request shall be incremental. In case of the Extended rtPS, if the MSB is 1, the BS changes its polling size into the size specified in the LSBs of this field. |
| PiggyBack Request | 16 | PiggyBack Request when BRW bit is set to 0 The number of bytes of UL bandwidth requested by the MS |
| | 16 − n | PiggyBack Request when BRW bit is set to 1 The number of bytes of UL bandwidth requested by the MS |
| The order of CID to try PGB | n | The rank of a CID requesting piggyback in CID list of the MS |

Referring to Table 4, the PiggyBack Request field and The order of CID to try PGB field (hereinafter, referred to as Order field) are included in the proposed format of the grant management subheader. PiggyBack Request specifies the size of a bandwidth requested by a piggyback. The Order field indicates the rank of a CID for which the bandwidth is requested by the piggyback in a CID list made by the MS. The Order field is up to 5 bits long and the proposed format of the grant management subheader occupies 16 bits. Therefore, assuming that the Order field is 5 bits in the grant management subheader of the proposed format, i.e. a piggyback area, the PiggyBack Request field is 11 bits (=16−5).

The length n of the Order field is given by:

$$n = \min(5, m),$$ [Eqn. 1]

where m is the least integer that satisfies $2^m \geq k$. k is the total number of CIDs preserved by an MS corresponding to a generic MAC header CID. For example, if the MS has 12 CIDs in total, k=12, m=4, and n=4. Hence, the Order field is 4 bits long and the PiggyBack Request field is 12 bits.

With reference to Table 5, how the MS requests bandwidth allocation by use of a bit combination of the Type LSB and the BRW included in the generic MAC header will be described below.

TABLE 5

| Type LSB | BRW | Bandwidth allocation request |
|---|---|---|
| 0 | 0 | No piggyback |
| 0 | 1 | Borrow piggyback area of generic MAC header CID for another CID belonging to the MS |
| 1 | 0 | Piggyback for generic MAC header |
| 1 | 1 | Allow piggyback area of generic MAC header CID for another CID belonging to the MS |

To be more specific, the MS requests bandwidth allocation by a bit combination of the Type LSB and the BRW in the following manner.

(1) 00: No piggyback (2) 01: Although a bandwidth needs to be allocated to the generic MAC header CID, the piggyback area of the generic MAC header CID is borrowed temporarily for a particular CID of the MS higher than the generic MAC header CID in priority or urgency. The temporary borrowing means that the piggyback area is lent only for use at a current time instant, and the MS is the one corresponding to the generic MAC header CID. The MS makes a CID list in which its CIDs are listed according to a predetermined criterion and writes, in the Order field, the rank of the CID that will borrow the piggyback area in the CID list. The BS allocates a bandwidth to the CID corresponding to the rank. The generic MAC header CID that lends its piggyback area can take the highest priority among CIDs of the same QoS class at the next request for UL bandwidth allocation.

(3) 10: Piggyback for the generic MAC header CID.

(4) 11: Since no bandwidth allocation is required for the generic MAC header CID, the piggyback area is allowed conditionally for a particular CID other than the generic MAC header CID among the CIDs of the MS. The conditional allowance means that the piggyback area is allowed for other CIDs until bandwidth allocation is required for the generic MAC header CID. The MS makes a CID list in which its CIDs are listed according to a predetermined criterion and writes, in the Order field, the rank of the CID that will be allowed to use the piggyback area in the CID list. The BS allocates a bandwidth to the CID corresponding to the rank. Then the BS cancels the earliest of polling chances allocated to the CID for which the MS has requested the bandwidth allocation, so as to save resources from the canceled polling for other purposes.

The MS prioritizes the CIDs by Equation 2 to which the present invention is not limited. Hence, the prioritization can be carried out in any other manner.

$$\text{priority} = \alpha(\text{service class weight}) + \beta(\text{delay}) + \gamma(\text{number of bandwidth borrows}),$$ [Eqn. 2]

where $\alpha$, $\beta$ and $\gamma$ are weights for the respective components of equation (2) and can be changed adaptively according to situations of the communication system. The service class weight $\alpha$ is a weight applied to the service class to which the CID belongs and delay denotes the service delay time of the CID. delay can be replaced by the ratio of an actual delay time to a maximum delay allowed for the CID. number of bandwidth borrows is the number of times of the CID's borrowing the piggyback area of the generic MAC header CID according to the proposed scheme. Each time the generic MAC header CID wins a bandwidth allocation request chance, number of bandwidth borrows is reset to '0'.

Now a description will be made of an operation for requesting bandwidth allocation by an MS according to an exemplary embodiment of the present invention with reference to FIG. 4.

Figure 4:
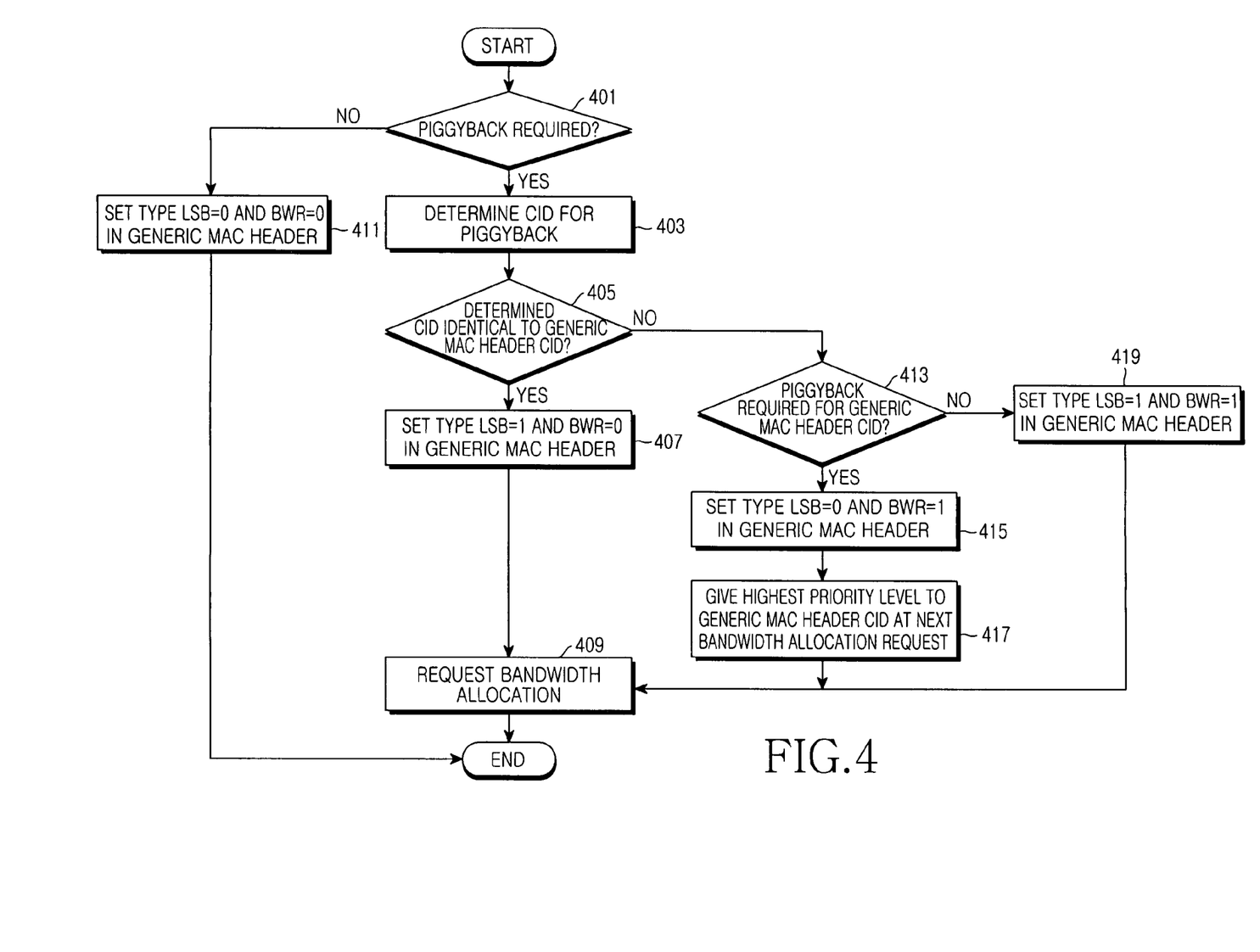
FIG. 4 is a flowchart illustrating an operation for requesting bandwidth allocation by an MS according to an exemplary embodiment of the present invention.

FIG. 4 is a flowchart illustrating the operation for requesting bandwidth allocation by the MS according to the exemplary embodiment of the present invention.

Referring to FIG. 4, the MS determines whether a piggyback for requesting bandwidth allocation is required in step 401. If the piggyback is not required, the MS sets a Type LSB and a BRW to 0s in a generic MAC header in step 411.

If the piggyback is required, the MS selects a CID for which the piggyback will be carried out, taking into account the priority levels, urgency levels, QoS levels, or the like of CIDs in step 403. In step 405, the MS determines whether the selected CID is a generic MAC header CID. If the selected CID is the generic MAC header CID, the MS sets the Type LSB to 1 and the BRW to 0 in step 407 and requests bandwidth allocation for the generic MAC header CID by the piggyback in step 409.

If the selected CID is not the generic MAC header CID in step 405, the MS determines whether the generic MAC header CID requires the piggyback in step 413. If the generic MAC header CID requires the piggyback, the MS goes to step 415. In the case where transmission data exists for the generic MAC header CID and bandwidth allocation is needed for the generic MAC header CID by a piggyback, it can be said that the generic MAC header CID requires the piggyback. In step 415, the MS sets the Type LSB to 0 and the BWR to 1 in the generic MAC header. Then the MS lends the piggyback area of the generic MAC header CID to the CID selected in step 403. In step 417, the highest priority level of a service class with the same QoS is given to the generic MAC header CID, for the next UL bandwidth allocation request in step 417. Step 417 may be skipped depending on a system situation.

On the other hand, if the generic MAC header CID does not require the piggyback in step 413, the MS proceeds to step 419. In the case where there is no transmission data associated with the generic MAC header CID and thus it is not necessary to issue a bandwidth allocation request for the generic MAC header CID, it can be said that the generic MAC header CID does not require the piggyback. In step 419, the MS sets the Type LSB to 1 and the BWR to 1 in the generic MAC header. Then the MS allows the CID selected in step 403 to borrow the piggyback area of the generic MAC header CID.

The bandwidth allocation requesting operation of the MS in the communication system according to the exemplary embodiment of the present invention has been described above with reference to FIG. 4. An operation for allocating a bandwidth by a BS according to an exemplary embodiment of the present invention will be described below with reference to FIG. 5.

Figure 5:
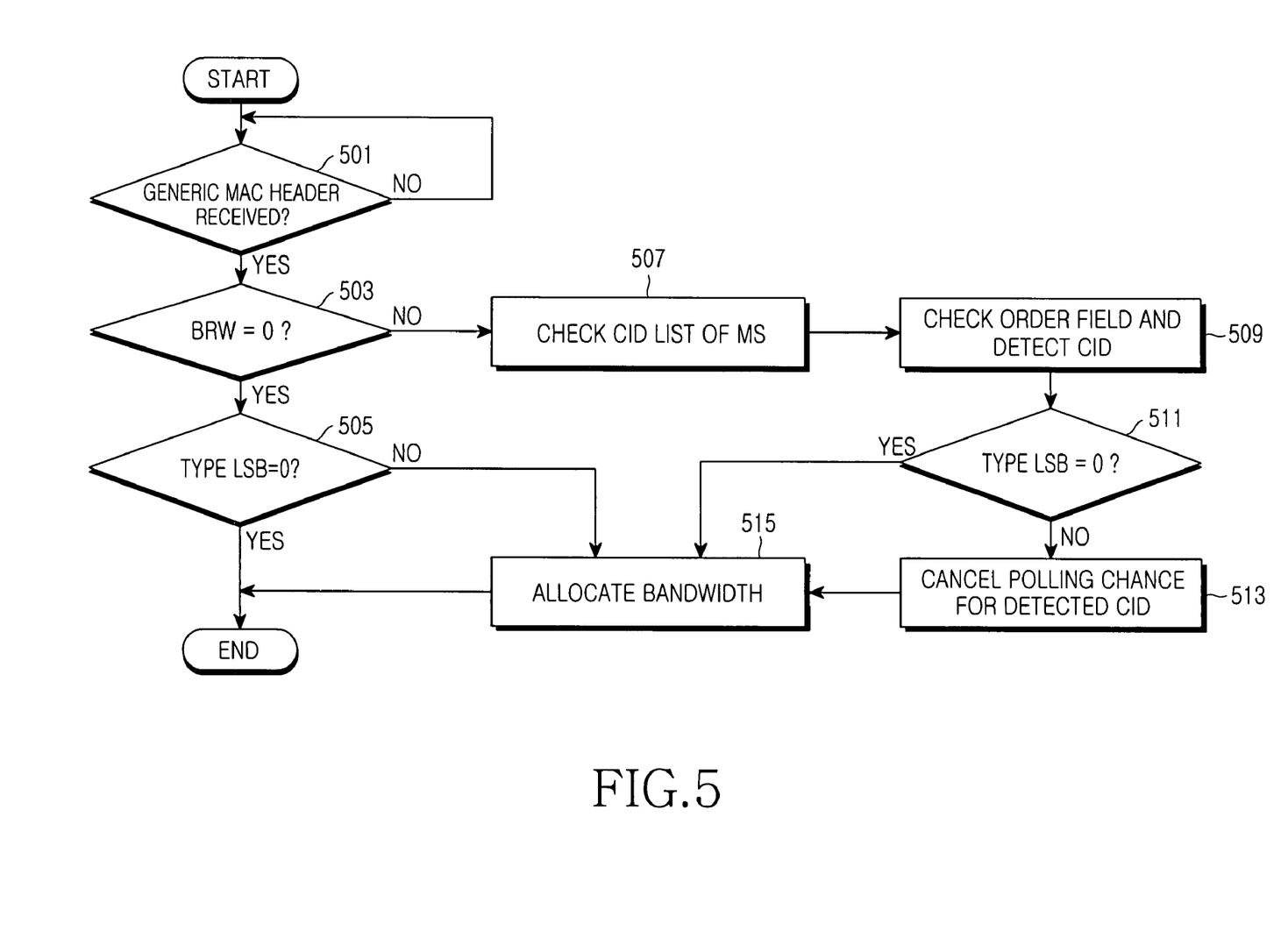
FIG. 5 is a flowchart illustrating an operation for allocating a bandwidth by a BS according to an exemplary embodiment of the present invention.

FIG. 5 is a flowchart illustrating the operation for allocating a bandwidth by the BS according to the exemplary embodiment of the present invention.

Referring to FIG. 5, upon receipt of a generic MAC header in step 501, the BS determines whether a BRW included in the generic MAC header is 0 in step 503. If the BRW is 0, the BS determines whether a Type LSB is 0 in the generic MAC header in step 505. If the Type LSB is not 0, that is, the Type LSB is 1, the BS allocates a bandwidth for a generic MAC header CID, taking into account a bandwidth written in a PiggyBack Request included in a piggyback area in step 515.

On the other hand, if the BRW is not 0, that is, the BRW is 1 in step 503, the BS checks a CID list of an MS corresponding to the generic MAC header CID in step 507 and checks an Order field in the piggyback area and detects a CID corresponding to a rank written in the Order field in step 509. In step 511, the BS determines whether the Type LSB is 0 in the generic MAC header in step 511. If the Type LSB is 0, the BS allocates a bandwidth for the CID detected in step 509, taking into account the bandwidth written in the PiggyBack Request of the piggyback area in step 515.

If the Type LSB is not 0, that is, the Type LSB is 1 in step 511, the BS cancels the earliest of polling chances given to the detected CID in step 513. The polling chance cancellation saves resources from the cancelled polling, for other purposes. The BS allocates a bandwidth for the CID detected in step 509, taking into account the bandwidth written in the PiggyBack Request of the piggyback area in step 515. The bandwidth allocation based on the grant management subheader or the piggyback area in step 515 will be detailed with reference to FIG. 6.

Figure 6:
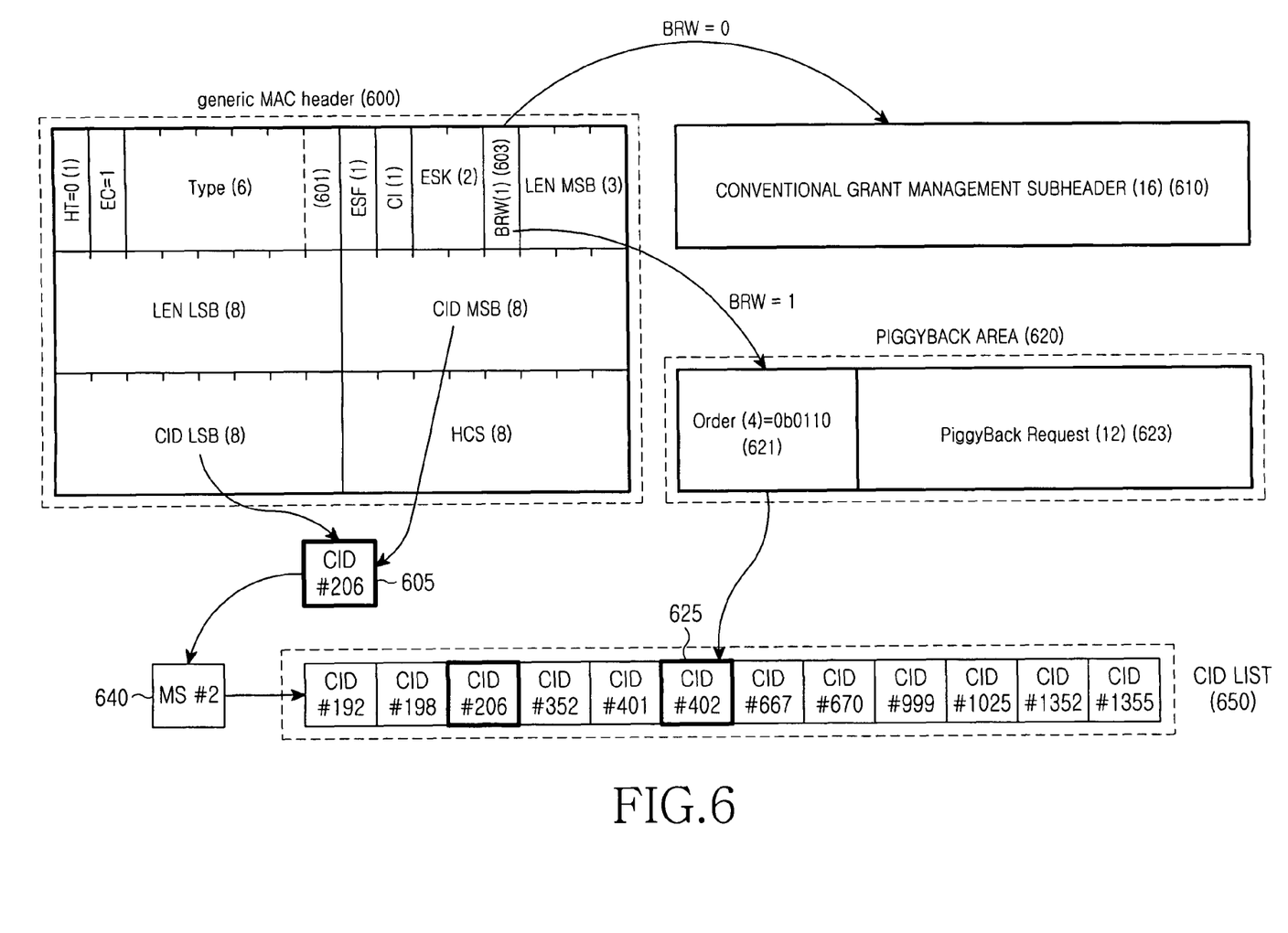
FIG. 6 Illustrates an operation for allocating a bandwidth by the BS according to an exemplary embodiment of the present invention.

FIG. 6 illustrates an exemplary operation for allocating a bandwidth by the BS according to an exemplary embodiment of the present invention.

Referring to FIG. 6, the BS receives a generic MAC header 600 from an MS and checks a Type LSB 601 and a BWR 603 included in the generic MAC header 600. If the BRW 603 is 0 and the Type LSB 601 is 1, the BS is aware that the MS requests bandwidth allocation by piggybacking the generic MAC header 600 with a grant management subheader 610 of the conventional format. If the BRW 601 and the Type LSB 601 are both 0s, the BS is aware that the MS does not request bandwidth allocation.

Meanwhile, if the BRW 603 is 1, the BS is aware that the MS requests bandwidth allocation by piggybacking the generic MAC header 600 with a grant management subheader of the proposed format, i.e. a piggyback area 620. Therefore, if the BRW 603 is 1, the BS checks a CID included in the generic MAC header 600 and searches for the CID in a CID list 650 of the MS corresponding to a generic MAC header CID. Herein, it is assumed that the MS is a second MS 640 (MS #2).

Then the BS detects the CID for which the MS requests bandwidth allocation, referring to an Order field 621 in the piggyback area 620 and the CID list 650. If 6 is written in the Order field 621, a 6-th ranked CID is a CID 625 (CID #402) in the CID list 650 and thus the CID requiring a bandwidth is CID #402. Hence, the BS allocates a bandwidth for CID #402 in accordance with a value written in a PiggyBack Request field 623 of the piggyback area 620.

Figure 7:
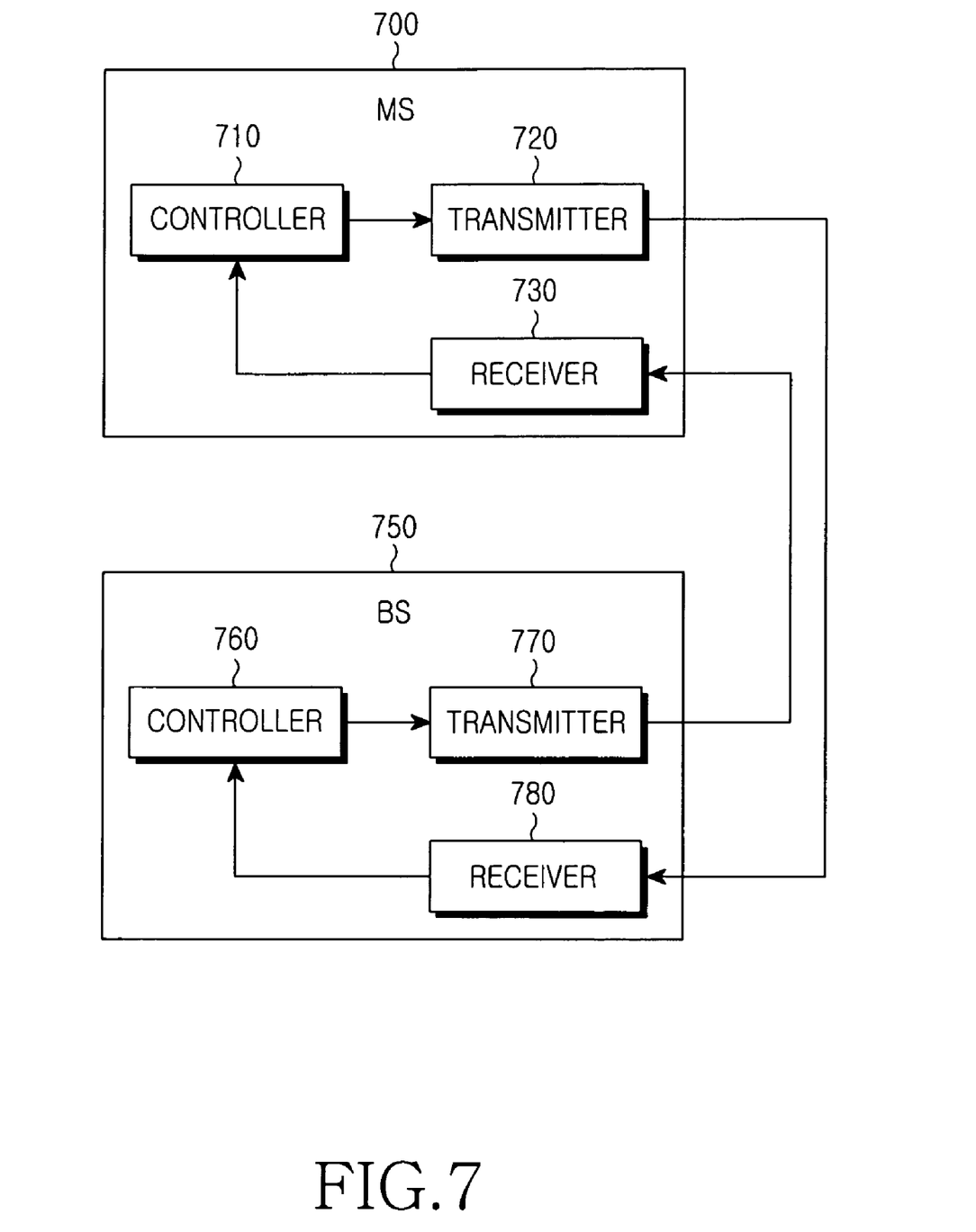
FIG. 7 is a block diagram of the MS and the BS according to an exemplary embodiment of the present invention.

Now a description will be made of the configuration of an MS for requesting bandwidth allocation and the configuration of a BS for allocating a bandwidth to the MS according to the request in the communication system according to an exemplary embodiment of the present invention.

FIG. 7 is a block diagram of the MS and the BS according to an exemplary embodiment of the present invention.

Referring to FIG. 7, an MS 700 includes a controller 710, a transmitter 720, and a receiver 730. A BS 750 also includes a controller 760, a transmitter 770, and a receiver 780.

In the MS 700, the controller 710 outputs a generic MAC header together with a grant management subheader to the transmitter 720 in steps 401 to 407 and steps 411 to 419 of FIG. 4. The transmitter 720 transmits the generic MAC header with the grant management subheader to the BS 750, thereby requesting bandwidth allocation.

In the BS 750, then, the receiver 780 receives provides the generic MAC header with the grant management subheader received from the transmitter 720 to the controller 760. The controller 760 allocates a bandwidth to the MS 700 in steps 503 to 515 of FIG. 5 and transmits information about the allocated bandwidth to the receiver 730 of the receiver 700 through the transmitter 770.

As is apparent from the above description, the present invention advantageously reduces the overhead resulting from an MS's requesting allocation of a bandwidth for a CID of the MS other than a generic MAC header CID of the MS by allowing a piggyback area set for the generic MAC header CID for the CID or lending the piggyback area to the CID.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for requesting bandwidth allocation in a mobile station in a communication system, comprising:

detecting a second Connection IDentifier (CID) requiring bandwidth allocation, the second CID being different from a first CID included in a Media Access Control (MAC) header;

generating a grant management subheader including an order field and a bandwidth field, the order field being for writing a rank of the second CID in a CID list listing CIDs of the mobile station according to a predetermined criterion and the bandwidth field being for writing a bandwidth required for the second CID; and concatenating the grant management subheader to the MAC header and transmitting the concatenated MAC header and grant management subheader to a base station to request bandwidth allocation for the second CID.

2. The method of claim 1, wherein the MAC header is a generic MAC header.

3. The method of claim 1, wherein the order field is of a size determined according to the number of CIDs of the mobile station.

4. The method of claim 1, wherein the MAC header includes at least one bit indicating whether bandwidth allocation is required for the first CID.

5. The method of claim 4, further comprising giving a highest priority level to the first CID at a next bandwidth allocation request among CIDs of the same service class as the first CID, if the at least one bit indicates that bandwidth allocation is required for the first CID.

6. The method of claim 5, wherein the service class is at least one of Unsolicited Guaranteed Service (UGS), real time Polling Service (rtPS), non real time Polling Service (nrtPS), extended rtPS, and Best Effort (BE) service.

7. A method for requesting bandwidth allocation in a base station in a communication system, comprising:

receiving from a mobile station a Media Access Control (MAC) header and a grant management subheader including an order field and a bandwidth field, the order field being for writing a rank of a second Connection IDentifier (CID) different from a first CID included in the MAC header and requiring bandwidth allocation in a CID list listing CIDs of the mobile station according to a predetermined criterion and the bandwidth field being for writing a bandwidth required for the second CID;

detecting the second CID in the order field;

detecting the bandwidth required for the second CID in the bandwidth field; and allocating an available bandwidth to the mobile station based on the detected bandwidth.

8. The method of claim 7, wherein the MAC header is a generic MAC header.

9. The method of claim 7, wherein the order field is of a size determined according to the number of CIDs of the mobile station.

10. The method of claim 7, wherein the MAC header includes at least one bit indicating whether bandwidth allocation is required for the first CID.

11. The method of claim 10, further comprising, if the at least one bit indicates that bandwidth allocation is not required for the first CID, canceling polling in an earliest of polling periods set for the second CID after the bandwidth allocation for the second CID, whereby saving a bandwidth from the second CID, for other purposes.

12. An apparatus for requesting bandwidth allocation in a mobile station in a communication system, comprising:

a controller for detecting a second Connection IDentifier (CID) requiring bandwidth allocation, the second CID being different from a first CID included in a Media Access Control (MAC) header, and generating a grant management subheader including an order field and a bandwidth field, the order field being for writing a rank of the second CID in a CID list listing CIDs of the mobile station according to a predetermined criterion and the bandwidth field being for writing a bandwidth required for the second CID; and a transmitter for concatenating the grant management subheader to the MAC header and transmitting the concatenated MAC header and grant management subheader to a base station to request bandwidth allocation for the second CID.

13. The apparatus of claim 12, wherein the MAC header is a generic MAC header.

14. The apparatus of claim 12, wherein the order field is of a size determined according to the number of CIDs of the mobile station.

15. The apparatus of claim 12, wherein the MAC header includes at least one bit indicating whether bandwidth allocation is required for the first CID.

16. The apparatus of claim 15, wherein the controller gives a highest priority level to the first CID at a next bandwidth allocation request among CIDs of the same service class as the first CID, if the at least one bit indicates that bandwidth allocation is required for the first CID.

17. The apparatus of claim 16, wherein the service class is at least one of Unsolicited Guaranteed Service (UGS), real time Polling Service (rtPS), non real time Polling Service (nrtPS), extended rtPS, and Best Effort (BE) service.

18. An apparatus for requesting bandwidth allocation in a base station in a communication system, comprising:

a receiver for receiving from a mobile station a Media Access Control (MAC) header and a grant management subheader including an order field and a bandwidth field, the order field being for writing a rank of a second Connection IDentifier (CID) different from a first CID included in the MAC header and requiring bandwidth allocation in a CID list listing CIDs of the mobile station according to a predetermined criterion and the bandwidth field being for writing a bandwidth required for the second CID; and a controller for detecting the second CID in the order field, detecting the bandwidth required for the second CID in the bandwidth field, and allocating an available bandwidth to the mobile station based on the detected bandwidth.

19. The apparatus of claim 18, wherein the MAC header is a generic MAC header.

20. The apparatus of claim 18, wherein the order field is of a size determined according to the number of CIDs of the mobile station.

21. The apparatus of claim 18, wherein the MAC header includes at least one bit indicating whether bandwidth allocation is required for the first CID.

22. The apparatus of claim 21, wherein if the at least one bit indicates that bandwidth allocation is not required for the first CID, the controller cancels polling in an earliest of polling periods set for the second CID after the bandwidth allocation for the second CID, whereby saving a bandwidth from the second CID, for other purposes.

* * * * *